United States Patent
Li et al.

(10) Patent No.: US 8,142,185 B1
(45) Date of Patent: Mar. 27, 2012

(54) INJECTION MOLD FORMING A PRODUCT HAVING A BARBED STRUCTURE

(75) Inventors: Jian-ming Li, Tu Cheng (TW); Xiao-ping Wu, Tu Cheng (TW); Shih-hsiung Ho, Tu Cheng (TW)

(73) Assignee: Cheng Uei Precision Industry Co., Ltd., Tu Cheng, Taipei (TW)

( * ) Notice: Subject to any disclaimer, the term of this patent is extended or adjusted under 35 U.S.C. 154(b) by 16 days.

(21) Appl. No.: 12/895,493

(22) Filed: Sep. 30, 2010

(51) Int. Cl.
*B29C 45/44* (2006.01)

(52) U.S. Cl. .................. 425/556; 425/577; 425/DIG. 58

(58) Field of Classification Search .................. 425/438, 425/468, 577, DIG. 58, 556
See application file for complete search history.

(56) References Cited

U.S. PATENT DOCUMENTS

| 4,923,388 | A | * | 5/1990 | Nakamura | 425/577 |
| 6,116,891 | A | * | 9/2000 | Starkey | 425/556 |
| 7,175,421 | B2 | * | 2/2007 | Takemoto et al. | 425/577 |
| 2002/0142056 | A1 | * | 10/2002 | Aperce et al. | 425/28.1 |
| 2002/0197428 | A1 | * | 12/2002 | Evans et al. | 428/35.7 |
| 2005/0208172 | A1 | * | 9/2005 | Buttigieg | 425/441 |

* cited by examiner

*Primary Examiner* — Timothy Heitbrink
(74) *Attorney, Agent, or Firm* — Cheng-Ju Chiang

(57) ABSTRACT

A mold for making a product having a barbed structure at an intermediate position thereof has a stationary mold including a fixing board, a mold board, a core, an oblique block, a limiting element, and an elastic element. The mold board has a trough and a limiting chute. The core has a cavity and a slide chute. The oblique block having a hole communicating the cavity is movably disposed in the slide chute. An end of the block is extendable out of the cavity and an opposite end forms an accommodating hole. The limiting element includes a limiting end extending into the accommodating hole and a fixing end movably disposed in the limiting chute. The elastic element of which one end is against the accommodating hole and an opposite end is set against the trough is disposed in the accommodating hole.

5 Claims, 5 Drawing Sheets

INJECTION MOLD FORMING A PRODUCT HAVING A BARBED STRUCTURE

TECHNICAL FIELD OF THE INVENTION

The present invention relates to a mold, and more particularly, to a mold for making a plastic product having a barbed structure at an intermediate portion thereof.

BACKGROUND OF THE INVENTION

Commodity products required in daily life become more and more diversified with the upgrading of living standard. Plastic products, such as mobile phone casings, MP3 player casings, plastic cups, and joysticks of game devices, are used everywhere in the world. To manufacture these products, plastic materials are heated and plasticized before being poured into molds. After the plastic materials are shaped and cooled down, the molds are opened and the products are thereby manufactured as desired. The plastic products often have barbed structures formed thereon. When a barbed structure is formed at a surface of a plastic product, a sideway core-pulling mechanism, which is often a sideway slidable block, must be used. When the mold is opened, the sideway core-pulling mechanism is driven by a guide mechanism to conduct a sideway movement for departing from the product. When the barbed structure is located at an intermediate portion of the plastic product, a special mold structure must be used to fulfill smooth molding and demolding operation at the time the mold is opened. However, the conventional mold for molding a plastic product having a barbed structure at an intermediate portion requires a large amount of space, consumes a large amount of materials, and requires high manufacturing costs.

SUMMARY OF THE INVENTION

An objective of the present invention is to provide a mold for making a plastic product having a barbed structure at an intermediate portion, occupies a small amount of space, comprises less mechanical components, and requires a reduced cost for the mold, in order to overcome the drawbacks of the known techniques.

To achieve the above objective, the present invention provides a mold for making a product having a barbed structure at an intermediate portion thereof. The mold comprises a stationary mold section and a movable mold section. The stationary mold section comprises a stationary mold fixing board, a stationary mold board mounted to the stationary mold fixing board, a stationary mold core fixed inside the stationary mold board, an oblique block, a position limiting element, and an elastic element. The stationary mold board forms an inclined extension trough and an inclined position limiting chute communicating the extension trough. The stationary mold core forms a stationary mold cavity. The stationary mold core forms an inclined slide chute, of which an end is in communication with the stationary mold cavity. The oblique block is movably disposed in the slide chute in such a way that an end of the oblique block is extendable out of the stationary mold cavity, and an opposite end forms an accommodating hole. The oblique block forms a molding hole communicating the stationary mold cavity. The position limiting element comprises a position limiting end and a fixing end connected to the position limiting end. The fixing end is received in the accommodating hole through the position limiting chute and fastened to the oblique block. The position limiting end is movably disposed in the position limiting chute. The elastic element is received in the accommodating hole of the oblique block and encompasses the fixing end. One end of the elastic element is set against a wall of the accommodating hole and an opposite end of the elastic element is positioned against a wall of the extension trough of the stationary mold board.

As described above, the mold according to the present invention utilizes the oblique block, which slidably in an inclined direction gets into the stationary mold cavity, to take a sliding motion at the time the mold is opened so as to force the product to move in a mold opening direction, thereby separating the product from the stationary mold section. Therefore, the mold according to the present invention has less mechanical components, occupies a smaller amount of space, and takes a low cost.

DETAILED DESCRIPTION OF THE INVENTION

Figure 1:
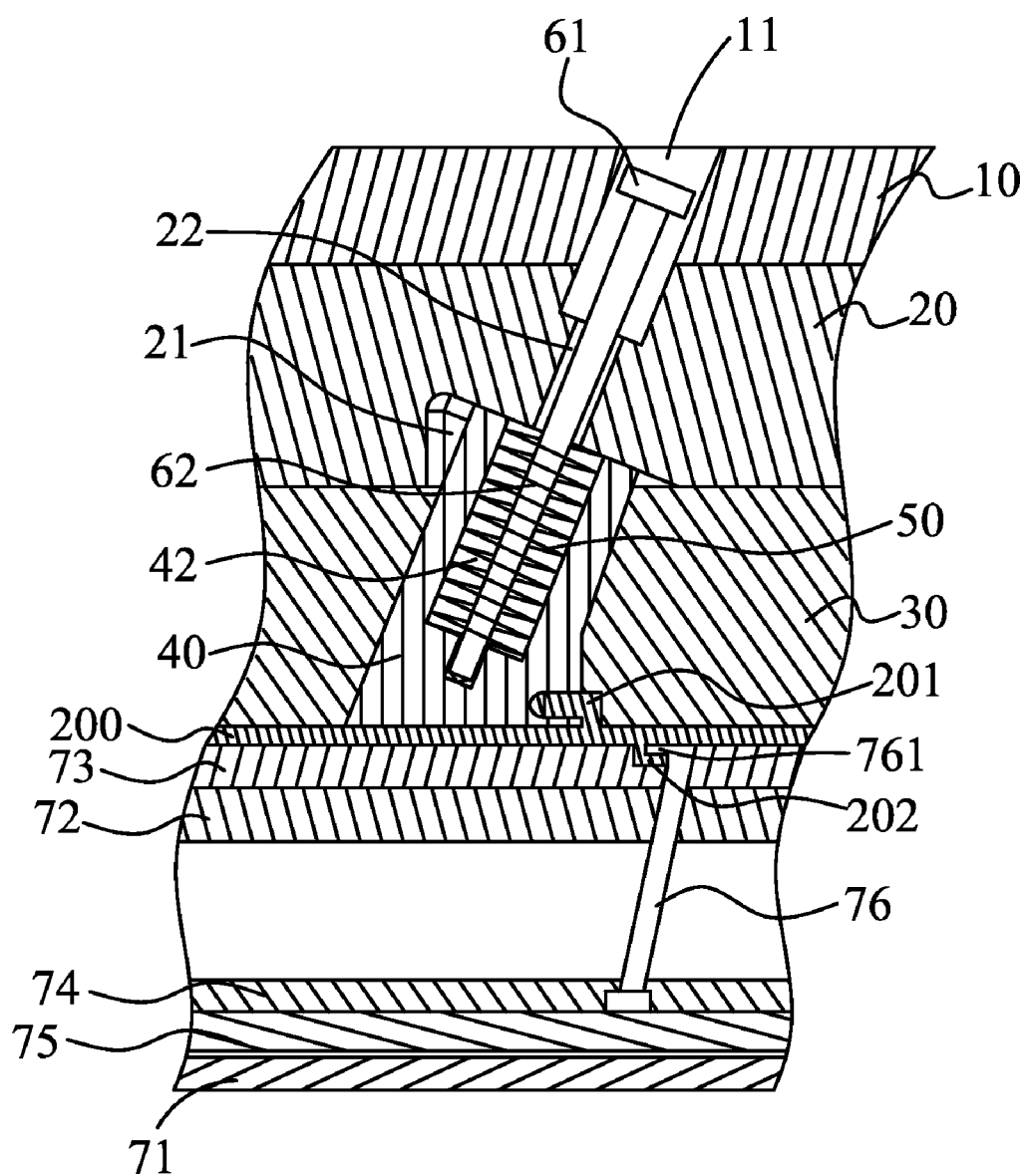
FIG. 1 is a schematic diagram showing a mold of the present invention in a mold closing state.

In order to illustrate the techniques, structural features, achieved objectives and effects of the present invention in details, examples are provided in conjunction with drawings and are described as follows.

Referring to FIGS. 1-5, the present invention provides a mold, which is utilized for molding a plastic product 200 having a pawl or barbed structure 201 substantially located at an intermediate portion of the product. The mold comprises a stationary mold section and a movable mold section (both not labeled). The stationary mold section comprises a stationary mold fixing board 10, a stationary mold board 20 mounted to the fixing board 10, a stationary mold core 30 fixed inside the stationary mold board 20, an oblique block 40, an elastic element 50, and a position limiting element 60.

Figure 2:
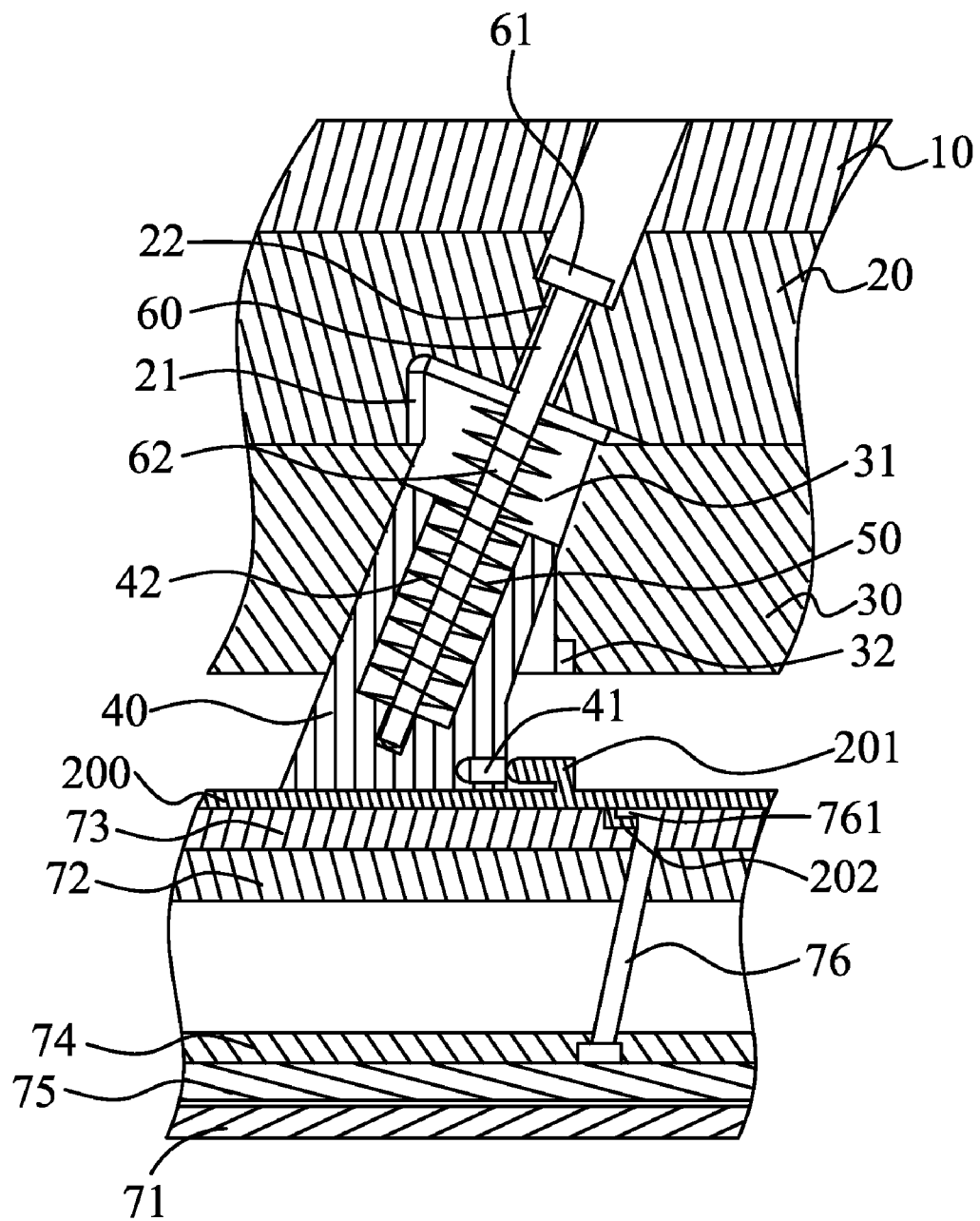
FIG. 2 is a schematic diagram showing a product departed from a stationary mold section at the time the mold shown in FIG. 1 is opened.
Figure 3:
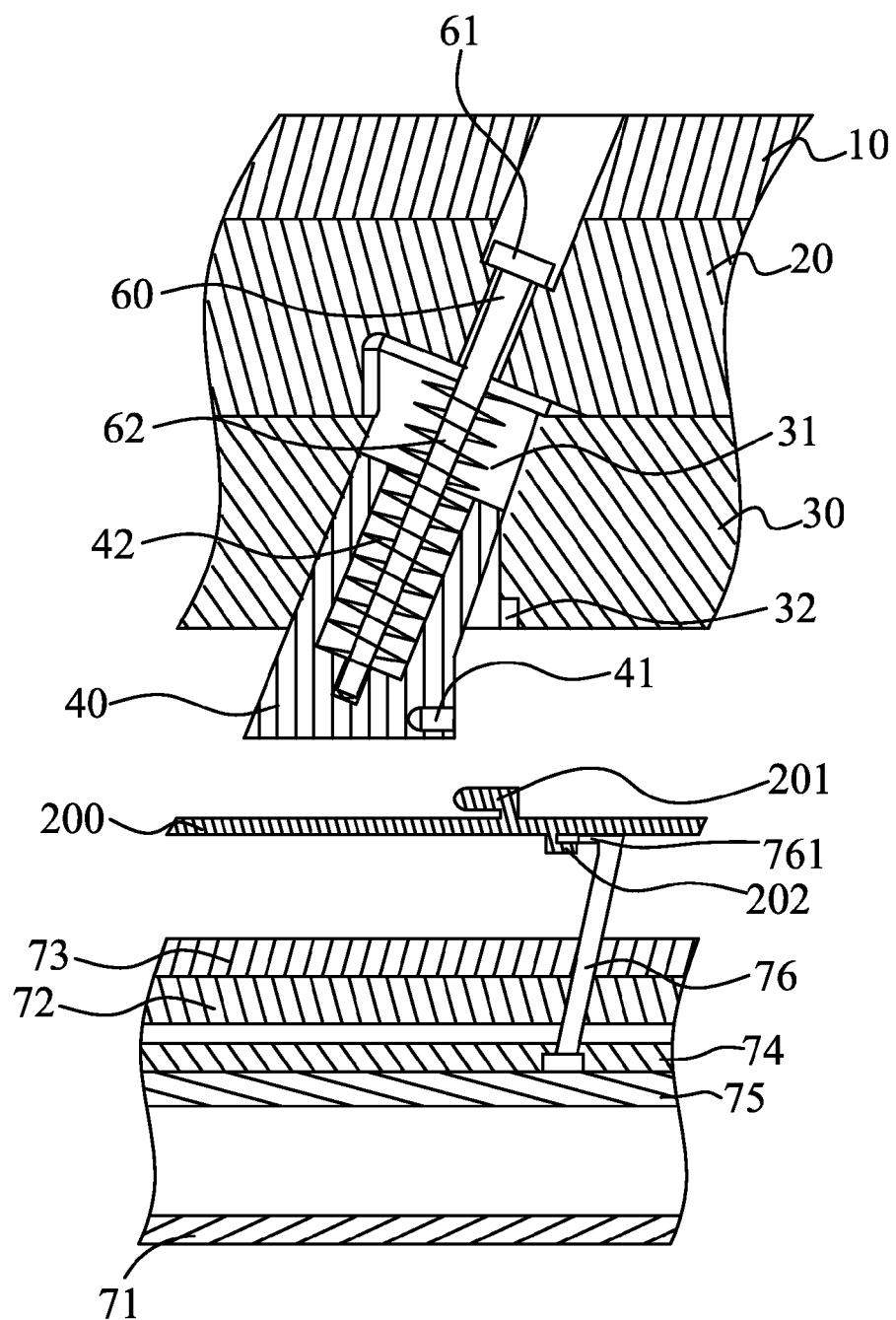
FIG. 3 is a schematic diagram showing the product departed from a movable mold section at the time the mold shown in FIG. 1 is opened.
Figure 4:
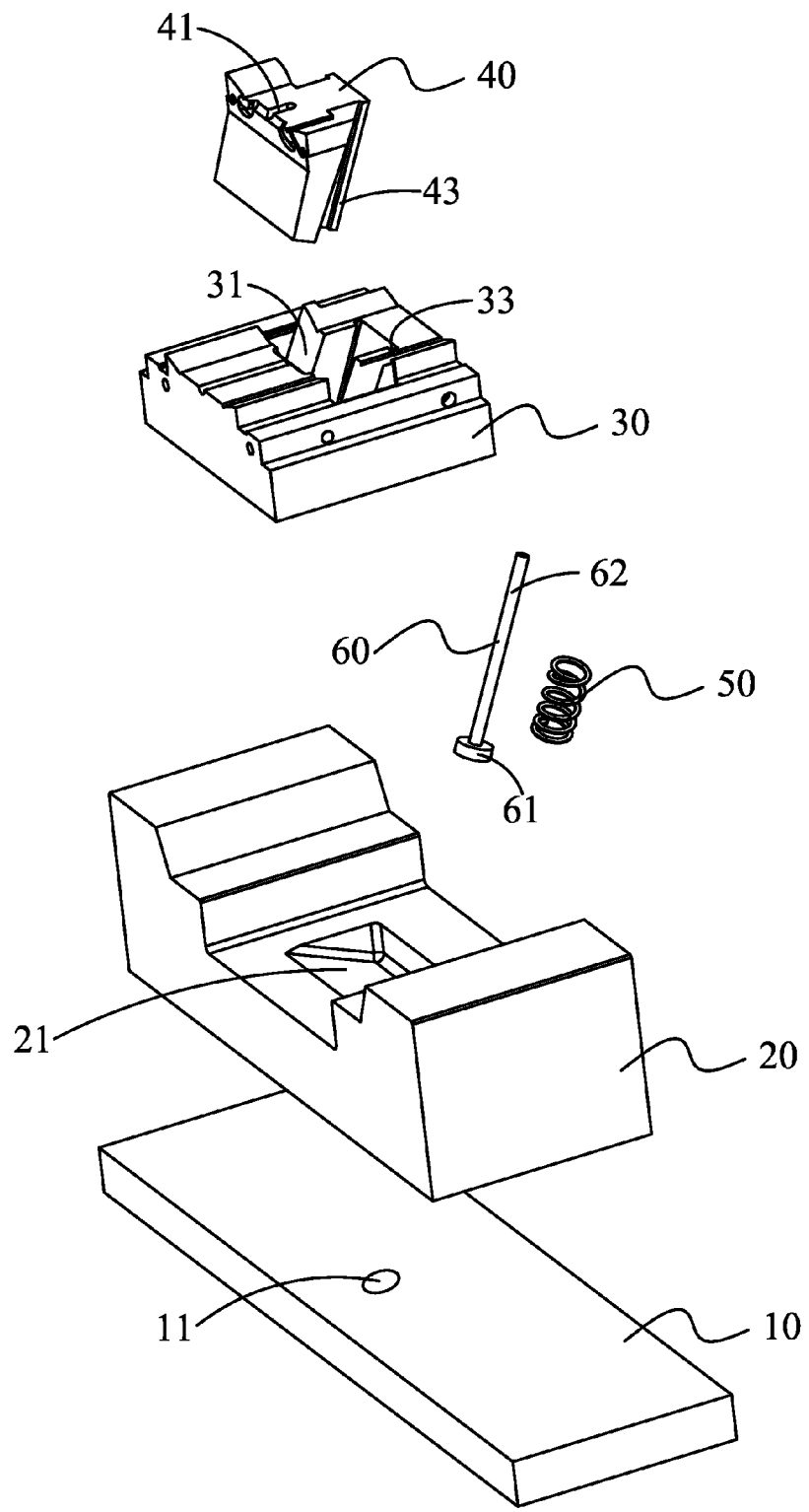
FIG. 4 is an exploded view of parts of the stationary mold section of the mold shown in FIG. 1.

Referring to FIGS. 2-4, the stationary mold core 30 forms a stationary mold cavity 32 therein. The stationary mold core 30 also forms an inclined slide chute 31 having an end of the slide chute 31 communicating the stationary mold cavity 32.

The stationary mold board 20 forms an extension trough 21 at a position corresponding to the slide chute 31 and an inclined position limiting chute 22 communicating the extension trough 21. The stationary mold fixing board 10 forms an inclined installation chute 11 at a position corresponding to the position limiting chute 22. The slide chute 31 has side walls respectively forming two inclined guide grooves 33 opposing each other.

Figure 5:
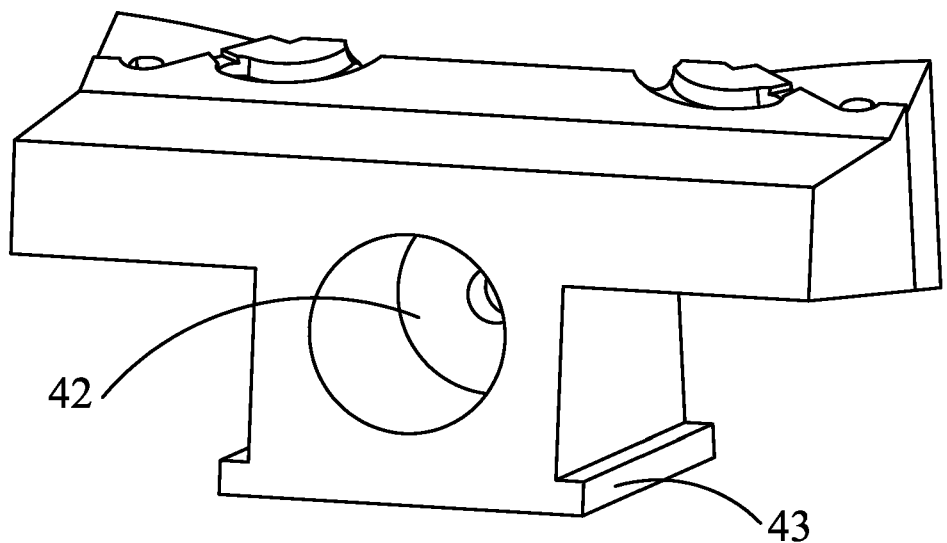
FIG. 5 is a perspective view of an oblique block of the mold shown in FIG. 1.

Further referring to FIGS. 3-5, the oblique block 40 is movably disposed in the slide chute 31 of the stationary mold core 30 in such a way that an end of the oblique block 40 is extendable out of the stationary mold cavity 32 to eject a molded product out. The oblique block 40 has a molding hole 41 in communication with the stationary mold cavity 32 for the pawl or barbed structure 201 located at the intermediate portion of the product 200. An opposite end of the oblique block 40 forms an accommodating hole 42. In addition, in order to make the oblique block 40 smoothly slide in the slide chute 31, the oblique block 40 has two inclined slide rails 43 protruding therefrom and the slide rails 43 are movably received in the guide grooves 33.

According to the instant embodiment, the elastic element 50 comprises a spring and the position limiting element 60 comprises a position limiting bolt. The position limiting element 60 comprises a position limiting end 61 and a fixing end 62 connected to the position limiting end 61.

To assemble, the fixing end 62 of the position limiting element 60 is received in the accommodating hole 42 by extending through the installation chute 11 and the position limiting chute 22, and is fastened to the oblique block 40. The position limiting end 61 is movably disposed in the position limiting chute 22 for limiting a sliding distance of the oblique block 40. The elastic element 50 is received in the accommodating hole 42 of the oblique block 40 and encompasses the fixing end 62. One end of the elastic element 50 is set against a wall of the accommodating hole 42 and an opposite end of the elastic element 50 is positioned against a wall of the extension trough 21 of the stationary mold board 20. Elastic deformation of the elastic element 50 allows the oblique block 40 to reciprocally slide within the slide chute 31 for a specific distance.

Operation of the mold according to the present invention will be described as follows.

Referring to FIGS. 1 and 2, when the mold is closed, the movable mold section and the stationary mold section are positioned together, making the oblique block 40 depressed by the movable mold section and slide and retract into the slide chute 31 to set the elastic element 50 in a compressed form and located inside the accommodating hole 42, and the end of the oblique block 40 that forms the accommodating hole 42 is brought into engagement with a wall of the extension trough 21 of the stationary mold board 20.

Once molding of the product 200 is completed, the movable mold section is departed from the stationary mold section at the time the mold is being opened. This makes the oblique block 40 no longer depressed by the movable mold section and thus, the spring force induced by the elastic element 50 drives the oblique block 40 to have one end thereof sliding out of the slide chute 31. The position limiting element 60 fastened on the oblique block 40 slides aslant along with the oblique block 40 until the position limiting end 61 is stuck by a wall of the position limiting chute 22. At the same time, the oblique block 40 presses the product 200 so that the product 200 is moved, along with the movable mold section, away from the stationary mold cavity 32 of the stationary mold core 30. Since the oblique block 40 slides along an inclined direction, the oblique block 40 moves a specific distance in a direction perpendicular to the mold opening direction, and the pawl or barbed structure 201 of the product 200 is thereby separated from the molding hole 41 of the oblique block 40 so as to fulfill the mold release.

In order to make the barbed structure 201 of the product 200 exactly fit for the mold release, the length of the fixing end 61 of the position limiting element 60 is selected according to the length of the pawl or barbed structure 201 of a specific product 200 in order to control the distance the oblique block 40 slides in the inclined direction.

Referring to FIGS. 2 and 3, in order to make sure that the product 200 is departed from the stationary mold section along with the movable mold section at the time the mold is being opened, the movable mold section further comprises a movable mold fixing board 71, a movable mold board 72 mounted to the fixing board 71, spacer blocks (not shown) mounted to and connecting between the movable mold fixing board 71 and the movable mold board 72, and a movable mold core 73 fixed inside the movable mold board 72. The movable mold core 73 forms a movable mold cavity (not shown). When the mold is closed, the movable mold cavity and a stationary mold cavity together define a cavity of the mold. The movable mold fixing board 71, the movable mold board 72, and the two spacer blocks form therebetween an accommodating space. A first ejector plate 74 and a second ejector plate 75 are fixed together and are received in the accommodating space for being movable within accommodating space in the directions of opening and closing the mold. The movable mold section comprises an inclined rod 76, which has one end attached to the first ejector plate 74 and the second ejector plate 75 and an opposite end extending, through the movable mold board 72, into the movable mold cavity aslant through the movable mold board 72 for selectively projecting out of the movable mold cavity. The opposite end of the inclined rod 76 forms a fixing portion 761 that extends in a direction substantially perpendicular to the mold closing direction, and the product 200 correspondingly has a side projection 202. The side projection 202 can be an inherent structure of the product 200. Alternatively, the side projection 202 is not an inherent part of the product 200 and instead being a manufacturing intermediate part to be removed after the product 200 is completed.

Specifically, the fixing portion 761 of the inclined rod 76 holds the side projection 202 of the product 200 after molding. Therefore, at the time the mold is opened, the product 200 is departed from the stationary mold section along with the movable mold section. After the pawl or barbed structure 201 of the product 200 is departed from the stationary mold section, the first ejector plate 74 and the second ejector plate 75 of the movable mold section forces the inclined rod 76 out, so that the end of the inclined rod 76 that extends into the movable mold cavity is caused to project out of the movable mold cavity, and the fixing portion 761 is thereby departed from the side projection 202 of the product 200. At the same time, the product 200 is separated from the movable mold cavity. To this point, the product 200 is completely separated from the stationary mold section and the movable mold section.

In summary, the mold of the present invention utilizes the oblique block 40, which slidably in an inclined direction gets into the stationary mold cavity 32, to take a sliding motion at the time the mold is opened so as to force the product 200 to move in the mold opening direction, thereby separating the product 200 from the stationary mold section. As a consequence, the mold according to the present invention has less mechanical components, occupies a smaller amount of space, and takes a low cost.

Although the present invention has been described with reference to the preferred embodiment thereof, it is apparent to those skilled in the art that a variety of modifications and changes may be made without departing from the scope of the present invention, which is intended to be defined by the appended claims.

What is claimed is:

1. A mold adapted to mold a product having an intermediate portion that forms a barbed structure, the mold comprising a stationary mold section and a movable mold section, the stationary mold section comprising:
   a stationary mold fixing board;
   a stationary mold board mounted to the stationary mold fixing board, the stationary mold board forming an inclined extension trough and an inclined position limiting chute communicating the extending trough;

a stationary mold core fixed inside the stationary mold board, the stationary mold core forming a stationary mold cavity, the stationary mold core forming an inclined slide chute having an end in communication with the stationary mold cavity;

an oblique block movably disposed in the slide chute and having an end extendable out of the stationary mold cavity and an opposite end forming an accommodating hole, the oblique block having a molding hole communicating the stationary mold cavity;

a position limiting element comprising a position limiting end and a fixing end connected the position limiting end, the fixing end being received in the accommodating hole by extending through the position limiting chute and fastened to the oblique block, the position limiting end being movably disposed in the position limiting chute; and an elastic element received in the accommodating hole of the oblique block and encompassing the fixing end, one end of the elastic element being set against a wall of the accommodating hole, an opposite end of the elastic element being positioned against a wall of the extension trough of the stationary mold board.

2. The mold according to claim 1, wherein the stationary mold fixing board forms an inclined installation chute at a position corresponding to the position limiting chute, and the fixing end extends through the installation chute and the position limiting chute to get into the accommodating hole chute and is fastened to the oblique block.

3. The mold according to claim 1, wherein the elastic element comprises a spring and the position limiting element comprises a position limiting bolt.

4. The mold according to claim 1, wherein the slide chute has a side wall forming an inclined guide groove, the oblique block comprising an inclined slide rail movably received in the guide groove.

5. The mold according to claim 1, wherein the movable mold section comprises a movable mold fixing board, a movable mold board mounted to the movable mold fixing board, a spacer block mounted to and connecting between the movable mold fixing board and the movable mold board, and a movable mold core fixed inside the movable mold board, the movable mold core forming a movable mold cavity, the movable mold cavity and the stationary mold cavity being combined together to define a cavity for the mold when the mold is closed, the movable mold fixing board, the movable mold board, and the spacer block together forming an accommodating space, a first ejector plate and a second ejector plate being fixed together and received in the accommodating space movable in directions of opening and closing the mold direction within the accommodating space, the movable mold section comprising an inclined rod, which has one end attached to the first ejector plate and the second ejector plate and an opposite end extending aslant, through the movable mold board, into the movable mold cavity and aslant extendable out of the movable mold cavity, the opposite end of the inclined rod having a fixing portion extending in a direction substantially perpendicular to the mold closing direction and the product correspondingly having a side projection, the fixing portion being holding the side projection.

* * * * *